Aug. 1, 1967  B. J. ORR ETAL  3,333,903
ENDLESS TRACK FOR TRACK LAYING VEHICLES
Filed April 15, 1966  3 Sheets-Sheet 1

Inventors
Bobby J. Orr
Jack E. Neilson
By Charles L. Schwab
Attorney

Aug. 1, 1967    B. J. ORR ETAL    3,333,903
ENDLESS TRACK FOR TRACK LAYING VEHICLES
Filed April 15, 1966    3 Sheets-Sheet 2

Inventors
Bobby J. Orr
Jack E. Neilson
By
Attorney

Aug. 1, 1967  B. J. ORR ETAL  3,333,903
ENDLESS TRACK FOR TRACK LAYING VEHICLES
Filed April 15, 1966  3 Sheets-Sheet 3

Inventors
Bobby J. Orr
Jack E. Neilson
By Charles C. Schwab
Attorney

United States Patent Office 3,333,903
Patented Aug. 1, 1967

3,333,903
ENDLESS TRACK FOR TRACK LAYING VEHICLES
Bobby J. Orr and Jack E. Neilson, Springfield, Ill., assignors to Allis-Chalmers Manufacturing Company, Milwaukee, Wis.
Filed Apr. 15, 1966, Ser. No. 542,803
9 Claims. (Cl. 305—53)

This invention relates to an improved track link for endless track belts and particularly to a track link of high efficiency, low weight and cost better riding qualities and lower noise level which may be operated at higher speeds than the usual track speeds for crawler tractors.

Heretofore, endless track belts for track laying vehicles have included a pair of side bars forming rails for the truck rollers which are interconnected to similar pairs of side bars by pins and bushing. In such prior art designs, a sprocket drives the track by engagement with the bushings. Further, it is conventional in such designs to bolt the track shoes to the bottom of the side bars thus permitting ready replacement of worn shoes. The weight, cost, power consumption, vibration and noise level of prior art endless track belts used on crawler tractors has been quite substantial and it is an object of this invention to provide a lower cost track belt of less weight.

It is a further object of this invention to provide a track link with wide truck roller rolling surfaces which permits use with large diameter truck roller thus increasing wear life of both the track link and roller.

It is a further object of this invention to provide a track link design which is particularly suited to use in a short pitch belt.

It is a further object of this invention to provide a track link having low power consumption, low noise level, minimum vibration and improved rideability.

It is a further object of this invention to provide a track link suitable for relatively high speed crawler tractors.

It is a further object of this invention to provide a single piece track link of relatively light weight and low cost.

It is a further object of this invention to provide an improved track link with a central sprocket lug extending upwardly from and between a pair of truck roller rolling surfaces and having pivot portions at its transverse ends which are raised above the truck roller rolling surfaces.

These and other objects and advantages of this invention will be apparent when the following description is read in conjunction with the drawings in which.

Figure 1:
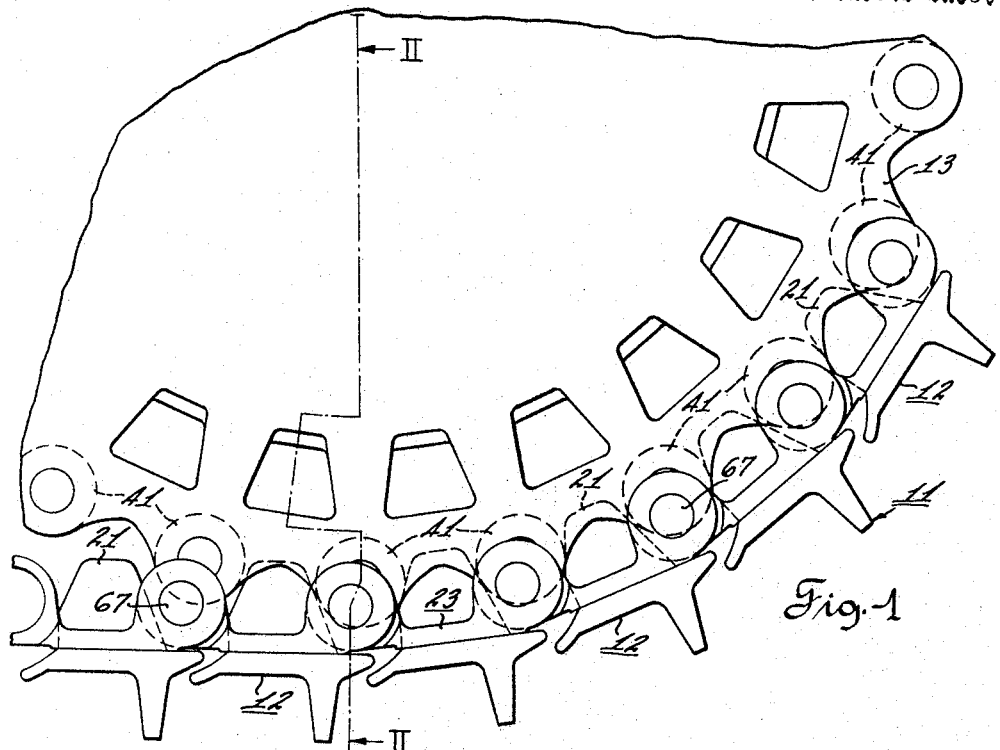
FIG. 1 shows a portion of a sprocket and a track belt incorporating one embodiment of the present invention.
Figure 2:
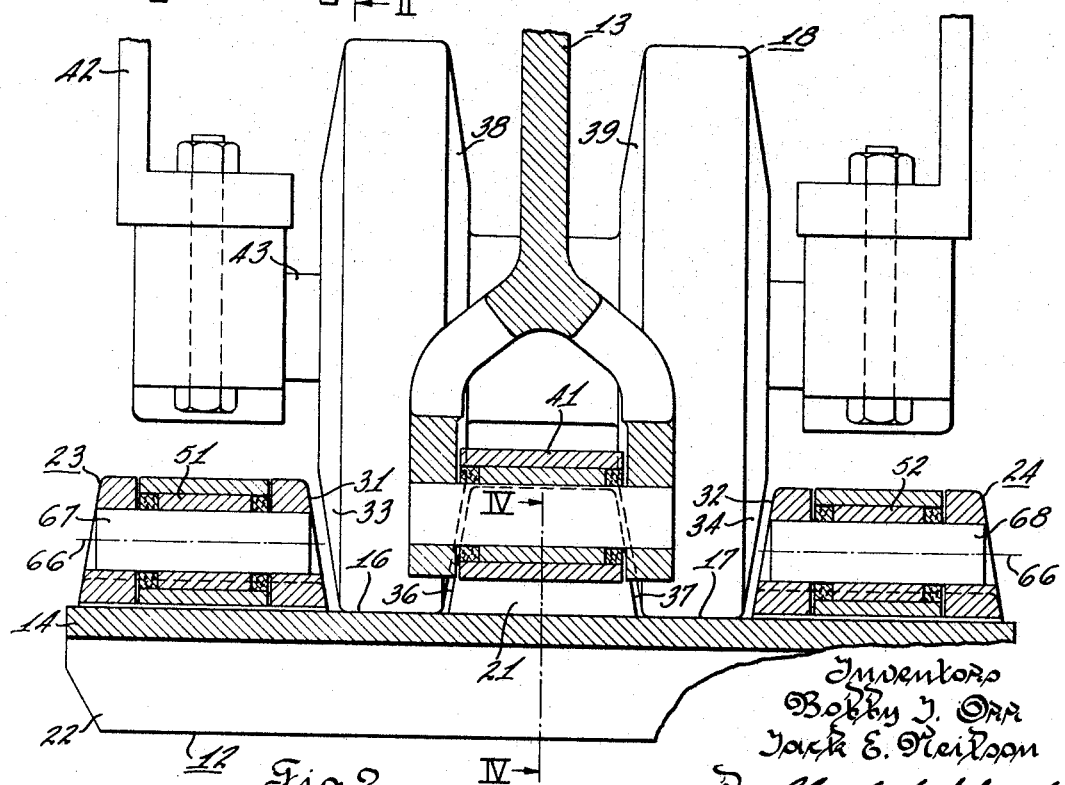
FIG. 2 is a section view taken along the line II—II in FIG. 1.
Figure 3:
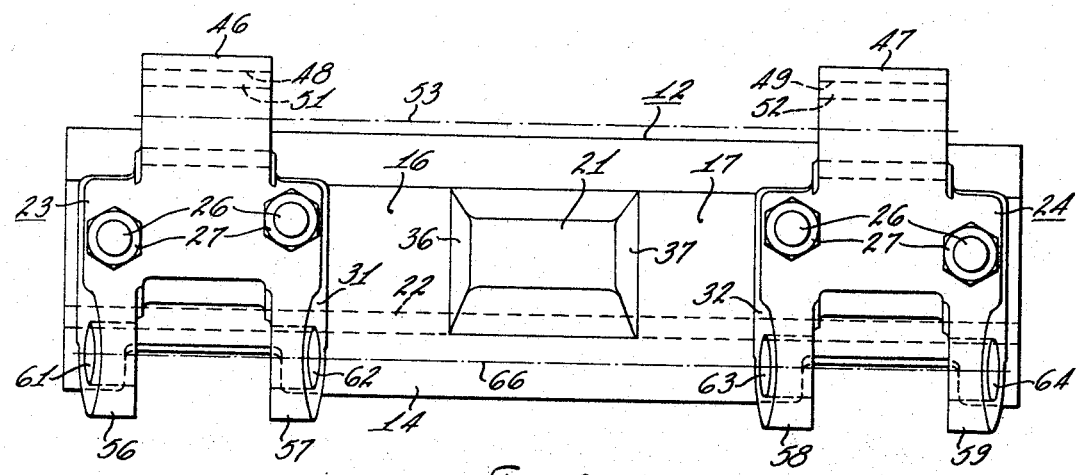
FIG. 3 is a top view of the track link shown in FIGS. 1 and 2.
Figure 4:
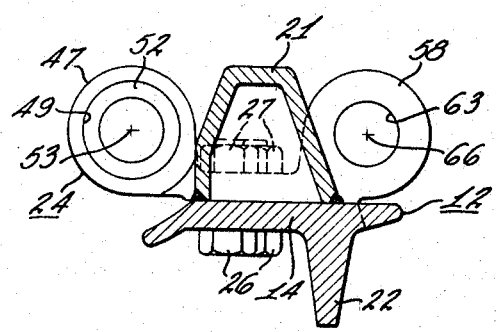
FIG. 4 is a section view taken along the lines IV—IV in FIG. 2.
Figure 5:
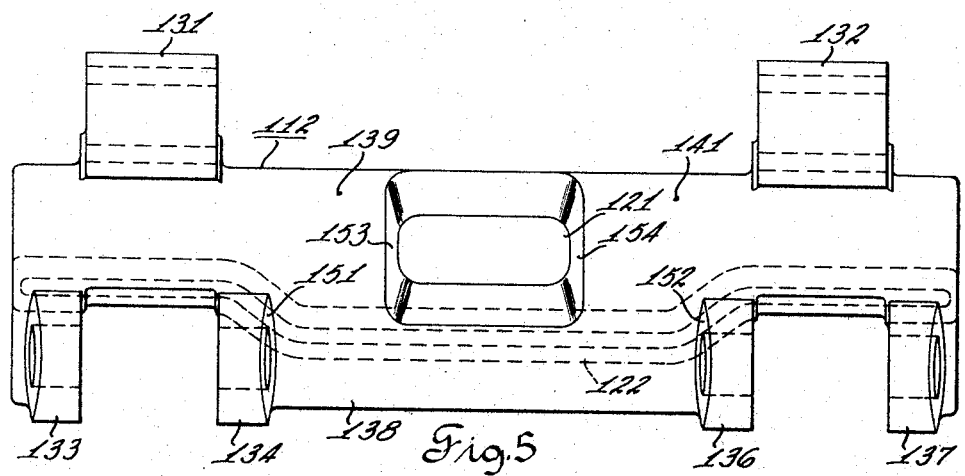
FIG. 5 is a top view of a second embodiment of the track link of this invention.
Figure 6:
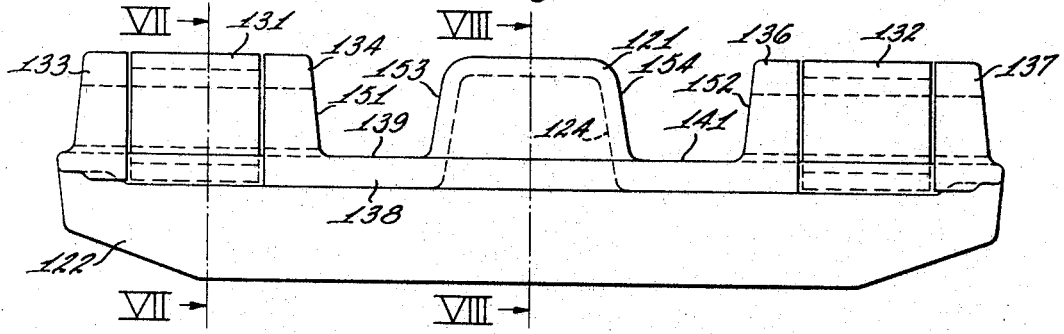
FIG. 6 is an rear view of the track link shown in FIG. 5.
Figure 7:
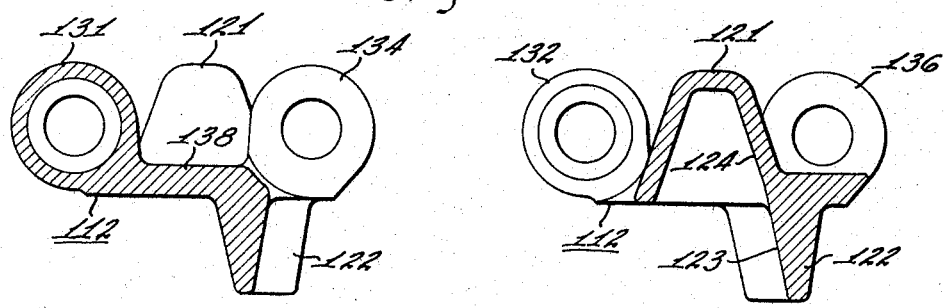
FIG. 7 is a section view taken along the line VII—VII in FIG. 6.
Figure 8:
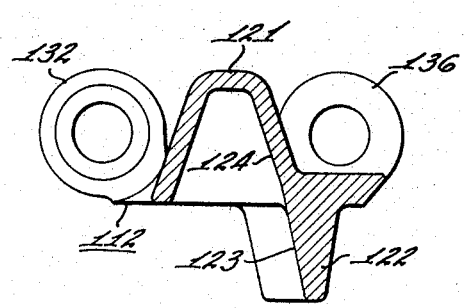
FIG. 8 is a section view taken along the line VIII—VIII in FIG. 6.

Referring to FIG. 1 an endless track belt 11 consisting of a plurality of identical links 12 is shown in engagement with a driving sprocket 13 such as might be used on a crawler tractor or the like. The track 11 is driven by the sprocket 13 through a plurality of circumferentially spaced rollers 41 pivotally mounted about the periphery of the sprocket. The use of rollers 41 avoids scuffing action with the sprocket lug 21. The truck roller 18 is secured to truck frame 42 in a conventional manner for rotation about a stationary shaft 43. As shown in FIG. 2 the shoe 14 of the link 12 has a pair of wide rolling surfaces 16, 17 in engagement with a large diameter truck roller 18. Further, as shown in FIGS. 3 and 4 an upstanding sprocket lug 21 is welded to shoe portion 14 between the pair of rolling surfaces 16, 17. A ground engaging cleat 22 is formed in a downwardly depending and transversely extending relation on the shoe 14. The track link embodiment illustrated in FIGS. 1 through 4 is completed by a pair of hinge members 23, 24 secured to the shoe 14 by releasably fastening means in the form of bolts 26 and nuts 27. Upward and outwardly sloping guide surfaces 31, 32 are formed on the hinge members 23, 24 complementary to the conically shaped side surfaces 33, 34 on truck wheel 18. Similarly the inwardly and upwardly sloping guide surfaces 36, 37 are formed on transversely opposite sides of the sprocket lug 21 complementary to the conical sides 38, 39 on truck roller 18. The full width of the rolling surfaces of the truck roller 18 engage the rolling surfaces 16, 17 of the link thus providing good wear life. The hinge members 23, 24 include pivot ears 46, 47, respectively, having aligned cylindrical bores 48, 49 in which bushings 51, 52 are installed. The axis 53 of bores 48, 49 lies above the rolling surfaces 16, 17 and is spaced longitudinally from the sprocket lug 21. The hinge members 23, 24 also include a pair of upstanding pivot lugs 56, 57 and 58, 59 which are spaced transversely from one another the transverse width of ears 46, 47 and include aligned pivot pin receiving bores 61, 62, 63, 64 which are aligned on a pivot axis 66 spaced above rolling surfaces 16, 17 and parallel to axis 53. A pair of axially spaced pins 67, 68 pivotally interconnect the links 12, as shown in FIG. 2. The link design of FIGS. 1 through 4 permits rebuilding the track by replacing the shoes 14 and worn bushings 51, 52, the hinge members 23, 24 being otherwise reusable.

A second embodiment of this invention is illustrated in FIGS. 5, 6, 7 and 8 wherein the link 112 is made in integral form from a single piece of material as by casting or forging. This design requires a minimum amount of machining and avoids possible misalignment of the pivot bores. While the shoe 14 in the first embodiment of this invention is formed from a rolled section thereby necessitating the ground cleat 22 being formed as a straight ridge, the ground engaging cleat 122 of the link 112 is curved to permit one side 123 thereof to be a continuation of one side of the pocket 124 within the sprocket lug 121, facilitating forging or casting of the links. The single piece link is considerably lighter than the multipart link illustrated in FIGS. 1 through 4 since the ears 131, 132 and pivot lugs 133, 134, 136, 137 are formed integrally with the shoe part 138 on which rolling surfaces 139, 141 are formed. The single piece link is also less expensive to manufacture. Guide surfaces 151, 152, 153, 154 are formed on the pivot lugs 134 and 136 adjacent the rolling surfaces 139, 141, in a manner similar to the guide surfaces 31, 32. Also the truck roller guide surfaces 153, 154 formed on transversely opposite sides of the sprocket lug 121 are similar to the guide surfaces 36, 37 formed on sprocket lug 121 of the previously described embodiment of the invention.

The links illustrating this invention are particularly suited to high speed crawler tractors. Wide truck roller rolling surfaces provide long wear life, and placing of the rolling surfaces 16, 17 and 139, 141 near the ground engaging portion of the link permits use of large diameter truck rollers. The lighter weight feature of this invention reduces motive power consumption and cost of material.

The embodiments of the invention for which an exclusive property or privilege is claimed are defined as follows:

1. A link for an endless track comprising:
   a pair of upward facing coplanar and transversely spaced truck wheel rolling surfaces,
   a sprocket lug extending upwardly between said rolling surfaces,
   a pair of upwardly projecting pivot ears at the transversely outward sides of said rolling surfaces, respectively, having transverse bores aligned on a first axis above said rolling surfaces in spaced relation to said sprocket lug,
   a first pair of upstanding pivot lugs at the transversely outer side of one of said rolling surfaces having pivot pin receiving bores aligned on a second axis parallel to said first axis and spaced above said rolling surfaces, and
   a second pair of upstanding pivot lugs at the transversely outer side of the other of said rolling surfaces having pivot pin receiving bores aligned on said second axis, said first and second axes being longitudinally spaced from one another and defining a plane intersecting said sprocket lug, and said pairs of pivot lugs being adapted to receive ears of adjoining links therebetween for pivot pin interconnection therewith.

2. The link set forth in claim 1 wherein the distance between said axes is not more than one-half of the transverse width of said link.

3. The link set forth in claim 1 wherein the pivot lugs adjacent said rolling surfaces include truck roller guide surfaces sloping upwardly in diverging relation to one another.

4. The link set forth in claim 1 wherein said sprocket lug presents a pair of truck roller guide surfaces on its transversely opposite sides extending upwardly in converging relation to one another.

5. The link set forth in claim 1 and further comprising a downwardly extending ground engaging cleat extending substantially the transverse width of said link.

6. The link set forth in claim 5 integrally formed of a single piece of material.

7. The link set forth in claim 1 wherein said ears and pivot lugs are formed on a pair of hinge members releasably secured to the remainder of said link.

8. The link set forth in claim 7 wherein said remainder includes a rolled section shoe to which said sprocket lug is rigidly secured.

9. The link set forth in claim 8 wherein said shoe includes a transverse ground cleat and said sprocket lug is welded to said shoe.

References Cited
UNITED STATES PATENTS

| | | | |
|---|---|---|---|
| 1,759,049 | 5/1930 | Fykse | 305—57 X |
| 1,877,135 | 9/1932 | Knox | 305—58 |
| 2,483,961 | 10/1949 | Ball | 305—58 X |
| 2,854,294 | 9/1958 | Bannister | 305—57 X |

BENJAMIN HERSH, *Primary Examiner.*

RICHARD J. JOHNSON, LEO FRAGLIA, *Examiners.*